(12) United States Patent
Tsugimura

(10) Patent No.: US 9,134,943 B2
(45) Date of Patent: Sep. 15, 2015

(54) TERMINAL DEVICE AND CONTROL OF SETTING SELECTION IMAGES OF TERMINAL DEVICE

(71) Applicant: BROTHER KOGYO KABUSHIKI KAISHA, Nagoya-shi, Aichi-ken (JP)

(72) Inventor: Koichi Tsugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/320,997

(22) Filed: Jul. 1, 2014

(65) Prior Publication Data

US 2015/0009532 A1    Jan. 8, 2015

(30) Foreign Application Priority Data

Jul. 3, 2013  (JP) ................. 2013-139468

(51) Int. Cl.
    *G06F 15/00* (2006.01)
    *G06K 1/00* (2006.01)
    *G06F 3/12* (2006.01)

(52) U.S. Cl.
    CPC ............ *G06F 3/1292* (2013.01); *G06F 3/1203* (2013.01); *G06F 3/1236* (2013.01)

(58) Field of Classification Search
    None
    See application file for complete search history.

(56) References Cited

U.S. PATENT DOCUMENTS

| | | | | |
|---|---|---|---|---|
| 5,467,434 A | * | 11/1995 | Hower et al. | 358/1.15 |
| 8,390,866 B2 | * | 3/2013 | Mullender et al. | 358/1.16 |
| 8,687,217 B2 | * | 4/2014 | Jung | 358/1.15 |
| 8,711,416 B1 | * | 4/2014 | Byer et al. | 358/1.15 |
| 8,826,126 B1 | * | 9/2014 | Toscano et al. | 715/274 |
| 2002/0120742 A1 | * | 8/2002 | Cherry | 709/226 |
| 2005/0275869 A1 | * | 12/2005 | Yokoyama | 358/1.14 |
| 2007/0283345 A1 | * | 12/2007 | Fujishita | 717/174 |
| 2010/0104099 A1 | * | 4/2010 | Kim | 380/270 |
| 2010/0285786 A1 | | 11/2010 | Yamada et al. | |
| 2011/0060833 A1 | * | 3/2011 | Nogawa | 709/225 |
| 2014/0118769 A1 | * | 5/2014 | Adachi et al. | 358/1.13 |
| 2014/0137194 A1 | * | 5/2014 | Nagasaki | 726/3 |
| 2014/0268224 A1 | * | 9/2014 | Inoue | 358/1.15 |
| 2014/0293327 A1 | * | 10/2014 | Miyazaki | 358/1.15 |
| 2014/0327937 A1 | * | 11/2014 | Srinivasmurthy et al. | 358/1.18 |
| 2015/0077782 A1 | * | 3/2015 | Asai | 358/1.13 |

FOREIGN PATENT DOCUMENTS

| | | |
|---|---|---|
| JP | 2009-033256 A | 2/2009 |
| JP | 2011-054135 A | 3/2011 |

* cited by examiner

*Primary Examiner* — Ming Hon
(74) *Attorney, Agent, or Firm* — Scully, Scott, Murphy & Presser, PC

(57) ABSTRACT

A non-transitory computer-readable medium having a computer program stored thereon and readable a computer of a terminal device, the computer program, when executed by the computer, causes the computer to perform: controlling a display unit to display a first image as a selection image including first and second items for receiving instructions relative to image processing; controlling the display unit to display a second image as the selection image if the terminal device and the first image processing device are connected using the second wireless communication system; instructing a first image processing device to perform the image processing in response to receiving a performance instruction. In the first image, the first item is displayed preferentially. In the second image, the second item is displayed preferentially.

10 Claims, 6 Drawing Sheets

FUNCTION INFORMATION ITEM
(MULTI-FUNCTION DEVICE 200A)

FUNCTION INFORMATION ITEM
(MULTI-FUNCTION DEVICE 200B)

TERMINAL DEVICE AND CONTROL OF SETTING SELECTION IMAGES OF TERMINAL DEVICE

CROSS-REFERENCE TO RELATED APPLICATIONS

This application claims priority from Japanese Patent Application No. 2013-139468 filed on Jul. 3, 2013, the entire subject-matter of which is incorporated herein by reference.

TECHNICAL FIELD

The disclosure relates to control of a terminal device configured to communicate with an image processing device by use of wireless communication, and specifically, to control for displaying a selection image on a display unit of the terminal device.

BACKGROUND

Terminal devices such as smart phones are used to issue printing instructions to image processing devices such as multi-function devices by use of wireless communication. At this point, for some purposes such as improvement of convenience for users, items to be displayed on the display units of terminal devices are being devised. For example, there has been proposed a technology for changing the display order of function names to be displayed on a function selection screen of a terminal device such as a mobile phone, according to the surrounding environment of the terminal device. Specifically, by use of near field communication such as infrared communication, a mobile phone detects the number of other mobile phones positioned in the vicinity of the corresponding mobile phone. According to the detected number of other mobile phones, the mobile phone preferentially displays the names of functions to be more likely to be selected.

SUMMARY

Illustrative aspects of the present invention provide a technology capable of appropriately displaying items on a display unit of a terminal device capable of wireless communication with an image processing device.

According to one illustrative aspect of the present invention, there is provided a non-transitory computer-readable medium having a computer program stored thereon and readable a computer of a terminal device, the computer program, when executed by the computer, causes the computer to perform operations comprising: connecting the terminal device and a first image processing device by use of a first wireless communication system; controlling a display unit of the terminal device to display a first image as a selection image including a first item and a second item for receiving user's instructions relative to image processing; connecting the terminal device to the first image processing device by use of a second wireless communication system; controlling the display unit of the terminal device to display a second image as the selection image in a case where the terminal device and the first image processing device are connected by use of the second wireless communication system before the display unit is controlled to display the first image, the second image being different from the first image, and the second image including the first item and the second item; and instructing the first image processing device to perform the image processing in response to receiving an instruction for performing the image processing through the selection image, wherein in the first image, the first item is displayed in preference to the second item, and wherein in the second image, the second item is displayed in preference to the first item.

DETAILED DESCRIPTION

General Overview

Figure 1:
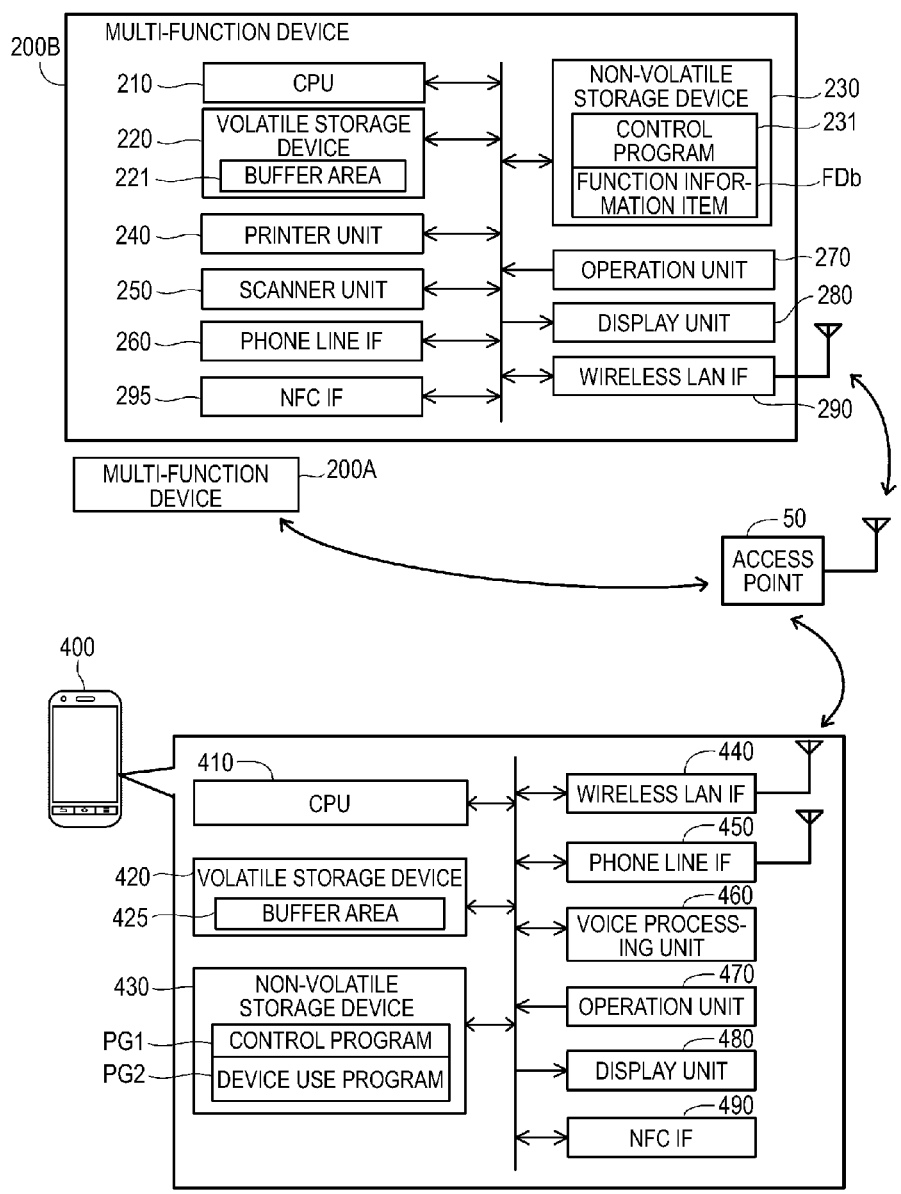
FIG. 1 is a block diagram illustrating a configuration of a system according to an illustrative embodiment.

Illustrative aspects of the present invention provide a technology capable of appropriately displaying items on a display unit of a terminal device capable of wireless communication with an image processing device.

According to one illustrative aspect of the invention, there is provided a non-transitory computer-readable medium having a computer program stored thereon and readable a computer of a terminal device, the computer program, when executed by the computer, causes the computer to perform operations comprising: connecting the terminal device and a first image processing device by use of a first wireless communication system; controlling a display unit of the terminal device to display a first image as a selection image including a first item and a second item for receiving user's instructions relative to image processing; connecting the terminal device to the first image processing device by use of a second wireless communication system; controlling the display unit of the terminal device to display a second image as the selection image in a case where the terminal device and the first image processing device are connected by use of the second wireless communication system before the display unit is controlled to display the first image, the second image being different from the first image, and the second image including the first item and the second item; and instructing the first image processing device to perform the image processing in response to receiving an instruction for performing the image processing through the selection image, wherein in the first image, the first item is displayed in preference to the second item, and wherein in the second image, the second item is displayed in preference to the first item.

In the above-described configuration, according to whether or not the terminal device and the first image processing device have been connected by use of the second wireless communication system, the selection images different from each other in the items required to be preferentially displayed are displayed on the display unit of the terminal device, respectively. Therefore, it is possible to appropriately display the plurality of items on the display unit of the terminal device.

In another illustrative aspect (2) of the non-transitory computer-readable medium of (1), the second wireless communication system may have a communication range that is shorter than a communication range of the first wireless communication system.

In the above-described configuration, according to whether or not the terminal device and the first image processing device have been connected by use of the second wireless communication system whose communication range is relatively short, the selection images different from each other in the items required to be preferentially displayed are displayed on the display unit of the terminal device, respectively. As a result, according to whether or not the distance between the terminal device and the first image processing device is relatively short, the selection images different from each other in the items required to be preferentially displayed are displayed on the display unit of the terminal device, respectively. Therefore, it is possible to more appropriately display the plurality of items on the display unit of the terminal device.

In still another illustrative aspect (3) of the non-transitory computer-readable medium of (2), the first item may be an item for receiving a setting instruction relative to the first image processing device, and the second item may be an item for receiving a performance instruction for the first image processing device to perform image processing.

In a case of performing image processing, it is often required to perform preparing for the image processing, confirming of the result of performance of the image processing, and so on. For this reason, it may be considered that in a case where the user (the terminal device) is relatively close to the first image processing device, a possibility that a performance instruction for image processing will be issued is relatively high; whereas in a case where the user (the terminal device) is relatively far from the first image processing device, a possibility that a performance instruction for image processing will be issued is relatively low. According to this configuration, in a case where a possibility that a performance instruction for image processing will be issued is relatively high, items for receiving performance instructions are preferentially displayed on the terminal device; whereas in a case where a possibility that a performance instruction for image processing will be issued is relatively low, items for receiving setting instructions are preferentially displayed on the terminal device. As a result, items which are more likely to be selected by the user are preferentially displayed. Therefore, it is possible to improve the convenience of the selection images.

In still another illustrative aspect (4) of the non-transitory computer-readable medium of any one of (1) to (3), the operation of controlling the display unit may further comprise, in a case where the terminal device and the first image processing device are connected by use of the second wireless communication system after a specific operation has been received from the user through the first image, controlling the display unit to display a third image that is different from the second image, as the selection image.

According to this configuration, according to whether or not the specific operation has been received from the user through the first image, the selection images different from each other are displayed on the display unit of the terminal device, respectively. Therefore, it is possible to display a more appropriate selection image on the display unit of the terminal device.

In still another illustrative aspect (5) of the non-transitory computer-readable medium of (4), the first item may include a first sub item relative to first image processing and a second sub item relative to second image processing, the operations may further comprise determining which sub item of the first sub item and the second sub item has been selected through the first image, and in the third image, an item relative to image processing corresponding to the selected sub item may be displayed in preference to an item relative to image processing corresponding to the unselected sub item.

In a case where a sub item relative to image processing is selected through the first image, it may be considered that a possibility that the user will use an image processing function corresponding to the selected sub item is high. According to this configuration, in the third image, an item relative to an image processing function corresponding to the selected sub item is displayed in preference to an item relative to an image processing function corresponding to the unselected sub item, and thus it is possible to preferentially display an item relative to an image processing function more likely to be used. Therefore, it is possible to more appropriately display the plurality of items on the display unit of the terminal device.

In still another illustrative aspect (6) of the non-transitory computer-readable medium of any one of (1) to (5), the operation of connecting may be able to connect the terminal device and a second image processing device by use of the second wireless communication system, the operation of controlling the display unit may further comprise: in a case where the terminal device and the second image processing device are connected by use of the second wireless communication system after the selection image for the first image processing device has displayed, controlling the display unit to display a fourth image as the selection image for the second image processing device; and in a case where the terminal device and the second image processing device are connected in a state where the selection image for the first image processing device has not been displayed, controlling the display unit to display a fifth image that is different from the fourth image, as the selection image for the second image processing device.

According to this configuration, in a case where a selection image for the first image processing device is displayed, and then the terminal device and the second image processing device are connected by use of the second wireless communication system, and in a case where the terminal device and the second image processing device are connected in a state where a selection image for first image processing device is not being displayed, different images are displayed as the selection image for the second image processing device, respectively. As a result, it is possible to display a more appropriate image as the selection image for the second image processing device.

In still another illustrative aspect (7) of the non-transitory computer-readable medium of (6), the first item included in the selection image for the second image processing device may include a third sub item relative to third image processing, and a fourth sub item relative to fourth image processing, the third image processing may include a function which is able to be performed by the second image processing device but is unable to be performed by the first image processing device, and in the fourth image, the third sub item may be displayed in preference to the fourth sub item.

After a selection image for the first image processing device is displayed, if a selection image for the second image processing device is displayed, a possibility that a function which can be performed by the second image processing device but cannot be performed by the first image processing device will be used is relatively high. According to this configuration, it is possible to preferentially display an item relative to image processing including a function relatively likely to be used. Therefore, it is possible to more appropriately display the plurality of items on the display unit of the terminal device.

In still another illustrative aspect (8) of the non-transitory computer-readable medium of (1) to (7), the first wireless communication system may use a network in which three or more devices are able to participate, the second wireless communication system may be configured to perform one-to-one communication between devices, and the operation of controlling the display unit may further comprise: controlling the display unit to display a designation image for allowing designation of one image processing device from a plurality of image processing devices connected to the network of the first wireless communication system; in a case where the first image processing device is selected through the designation image, controlling the display unit to display the first image; and in a case where the first image processing device is designated by connecting the terminal device and the first image processing device on a one-to-one basis by use of the second wireless communication system, controlling the display unit to display the second image.

According to this configuration, according to manners in which the first image processing device is designated, the selection images different from each other in the items required to be preferentially displayed are displayed on the display unit of the terminal device, respectively. Therefore, it is possible to appropriately display the plurality of items on the display unit of the terminal device.

The present invention may be implemented in various forms such as methods and terminal devices for implementing the functions of the above-described computer program, and non-transitory computer-readable recording medium having the above-described computer programs stored thereon.

Illustrative Embodiments

Configuration of System

Illustrative embodiments of the present invention will now be described on the basis of examples. FIG. 1 is a block diagram illustrating a configuration of a system according to an illustrative embodiment. The system includes a portable device 400 (one example of a terminal device), a plurality of multi-function devices 200A and 200B (examples of image processing devices), and an access point 50 for establishing a wireless local area network (LAN).

The access point 50 implements the functions of an access point of a wireless LAN, for example, by use of a communication system according to the standards of 802.11a, 802.11b, 802.11g, or 802.11n of the Institute of Electrical and Electronics Engineers (IEEE). The multi-function devices 200A and 200B and the portable device 400 are able to perform wireless communication using an infrastructure mode, through the access point 50.

The multi-function device 200B includes a CPU 210, a volatile storage device 220, a non-volatile storage device 230 such as a hard disk drive or a flash memory, a printer unit 240 that is a print engine for printing images in a predetermined mode (such as an inkjet mode or a laser mode), a scanner unit 250 that optically reads documents by use of an optical sensor (such as a contact image sensor (CIS)), and a phone line IF 260 that is an interface to be connected to a phone line. The multi-function device 200B further includes an operation unit 270 such as a touch panel and buttons, a display unit 280 that includes a display panel such as a liquid crystal panel superimposed on a touch panel, a wireless LAN IF 290, and an NFC IF 295.

The volatile storage device 220 includes a buffer area 221 for temporarily storing various intermediate data, which are generated when the CPU 210 performs processes. The non-volatile storage device 230 stores a control program 231 for controlling the multi-function device 200B, and a function information item FDb (to be described below).

The computer program 231 is stored in the non-volatile storage device 230 in advance, for example, during shipment of the multi-function device 200B. Also, the computer program 231 can be recorded in a CD-ROM or the like to be supplied, or can be downloaded from a server.

The CPU 210, when executing the control program 231, controls the multi-function device 200B to perform a plurality of image processing functions. Specifically, the CPU 210 controls the printer unit 240 to perform a printing process, and controls the scanner unit 250 to perform a scanning process. Also, the CPU 210 performs a facsimileing process, which includes a function of converting a document read by the scanner unit 250 into image data according to the standards of Fax Group 3 or 4, or the like, and transmitting the image data to an external device through the phone line IF 260, and a function of receiving image data from an external device through the phone line IF 260, and printing images represented by the image data, by use of the printer unit 240. Such image processing is performed on the basis of user's performance instructions. Also, the CPU 210 performs a variety of settings relative to image processing, on the basis of user's instructions. Performance instructions and setting instructions of a user may be received, for example, the operation unit 270. Alternatively, performance instructions and setting instructions of the user may be received through the portable device 400 of the user.

The wireless LAN IF 290 includes an antenna. The wireless LAN IF 290 is configured to perform two types of wireless communication, for example, according to the standards of 802.11 of IEEE, and standards (for example, 802.11a, 802.11b, 802.11g, or 802.11n) based on 802.11, thereby communicating with an external device such as the portable device 400. The two types of wireless communication are general Wi-Fi communication (also referred to simply as general WF communication) which is performed through the separate access point 50, and Wi-Fi Direct communication (also referred to simply as WFD communication) which is performed without using the access point 50. General WF communication and WFD communication are examples of communication using a first wireless communication system. In a network using the wireless LAN IF 290, three or more devices can participate.

The NFC IF 295 is an interface for performing near field communication (NFC) according to NFC standards. Communication using the NFC IF 295 is one-to-one communication between devices. NFC is an example of communication using a second wireless communication system.

The multi-function device 200A has no phone line IF 260. Further, the control program 231 of the multi-function device 200A does not include any program for implementing the facsimileing process. The other configuration of the multi-function device 200A is the same as that of the above-described multi-function device 200B.

Figure 2A:
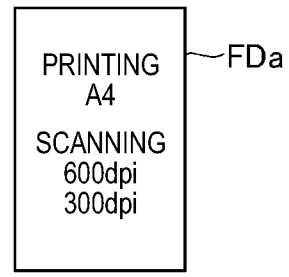
FIGS. 2A and 2B are views illustrating examples of function information items.
Figure 2B:
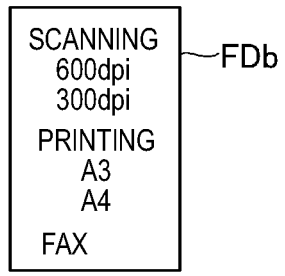

FIGS. 2A and 2B are views illustrating examples of function information items FDa and FDb, respectively. The function information item FDa of the multi-function device 200A shown in FIG. 2A is an information item including a description of the contents of functions which can be performed by the multi-function device 200A. The multi-function device 200A can perform a printing function and a scanning function. The multi-function device 200A cannot perform a facsimileing function. The multi-function device 200A can perform the printing function only with respect to A4 size paper, and cannot perform the printing function with respect to A3 size paper. The multi-function device 200A can perform the scanning function of reading a document at a read resolution of 600 dots per inch (dpi) or 300 dots per inch (dpi).

The function information item FDb of the multi-function device 200B shown in FIG. 2B is an information item including a description of the contents of functions which can be performed by the multi-function device 200B. The multi-function device 200B can perform a printing function, a scanning function, and a facsimileing function. The multi-function device 200B can perform the printing function with respect to A4 size paper and A3 size paper. The multi-function device 200B can perform the scanning function of reading a document at a read resolution of 600 dots per inch (dpi) or 300 dots per inch (dpi).

The portable device 400 is, for example, a multi-function mobile phone which is called a smart phone. The portable device 400 mainly includes a CPU 410, a volatile memory device 420 such as a RAM, a non-volatile storage device 430 such as a hard disk drive or a flash memory, a wireless LAN IF 440, a phone IF 450, a voice processing unit 460 that includes a speaker and a microphone and is for implementing a telephone function, an operation unit 470 that includes a touch panel, operation keys, and the like, a display unit 480 that includes a liquid crystal panel or the like superimposed on a touch panel, and an NFC IF 490.

The wireless LAN IF 440 includes an antenna, and can perform general WF communication or WFD communication, for example, according to the standards of 802.11 or the like of IEEE described above, thereby communicating with an external device. For example, the wireless LAN IF 440 is usable to transmit a print job to the multi-function device 200A or 200B or to receive a message from the multi-function device 200A or 200B, as will be described below. That is, the CPU 410 of the portable device 400 has a function of controlling the wireless LAN IF 440 such that the portable device 400 is connected to the multi-function device 200A or 200B by use of general WF communication or WFD communication which is the first wireless communication system.

The NFC IF 490 is an interface for performing near field communication according to NFC standards. That is, the CPU 410 of the portable device 400 has a function of controlling the NFC IF 490 such that the portable device 400 is connected to the multi-function device 200A or 200B by use of NFC which is the second wireless communication system.

The phone IF 450 includes an antenna, and performs wireless communication with a base station (not shown) on the basis of a mobile phone communication system (for example, W-CDMA). The phone IF 450 is usable, for example, for a connection to a telephone, or a connection to the Internet through a base station.

The volatile storage device 420 includes a buffer area 425 for temporarily storing various intermediate data, which are generated when the CPU 410 performs processes.

The non-volatile storage device 430 stores a control program PG1 and a device use program PG2. The control program PG1 is a program for implementing basic functions of the portable device 400 such as the functions of an operating system (OS) and a telephone function. The control program PG1 may be provided by the manufacturer of the portable device 400, and be stored in advance during shipment. The device use program PG2 is a program for implementing a function for remotely operating a plurality of image processing functions (for example, a printing function, a scanning function, and a facsimileing function) of the multi-function devices 200A and 200B. The device use program PG2 is a program (referred to as an application or the like) for adding a new function to the portable device 400, and may be provided so as to be downloadable from a predetermined server, for example, by a provider (for example, the manufacturer of the multi-function devices 200A and 200B) different from the manufacturer of the portable device 400. Alternatively, the device use program PG2 may be provided, for example, by the manufacturer of the portable device 400, and be stored in advance during shipment.

The CPU 410 executes the control program PG1, thereby implementing the basic functions of the portable device 400. Also, the CPU 410 executes the device use program PG2, thereby implementing an user interface function of receiving an instruction for the multi-function device 200A or 200B from the user, and a function of transmitting a setting instruction or a performance instruction to the multi-function device 200A or 200B according to an instruction of the user.

Also, the wireless LAN IF 290 and the NFC IF 295 of the multi-function device 200A or 200B can be operated independently from each another. Also, the wireless LAN IF 440 and the NFC IF 490 of the portable device 400 can be operated independently from each other. Therefore, the multi-function device 200A and the portable device 400 can perform communication (general WF communication or WFD communication) through their wireless LAN IFs, and communication through their NFC IFs in parallel.

(Operation of System)

Figure 3:
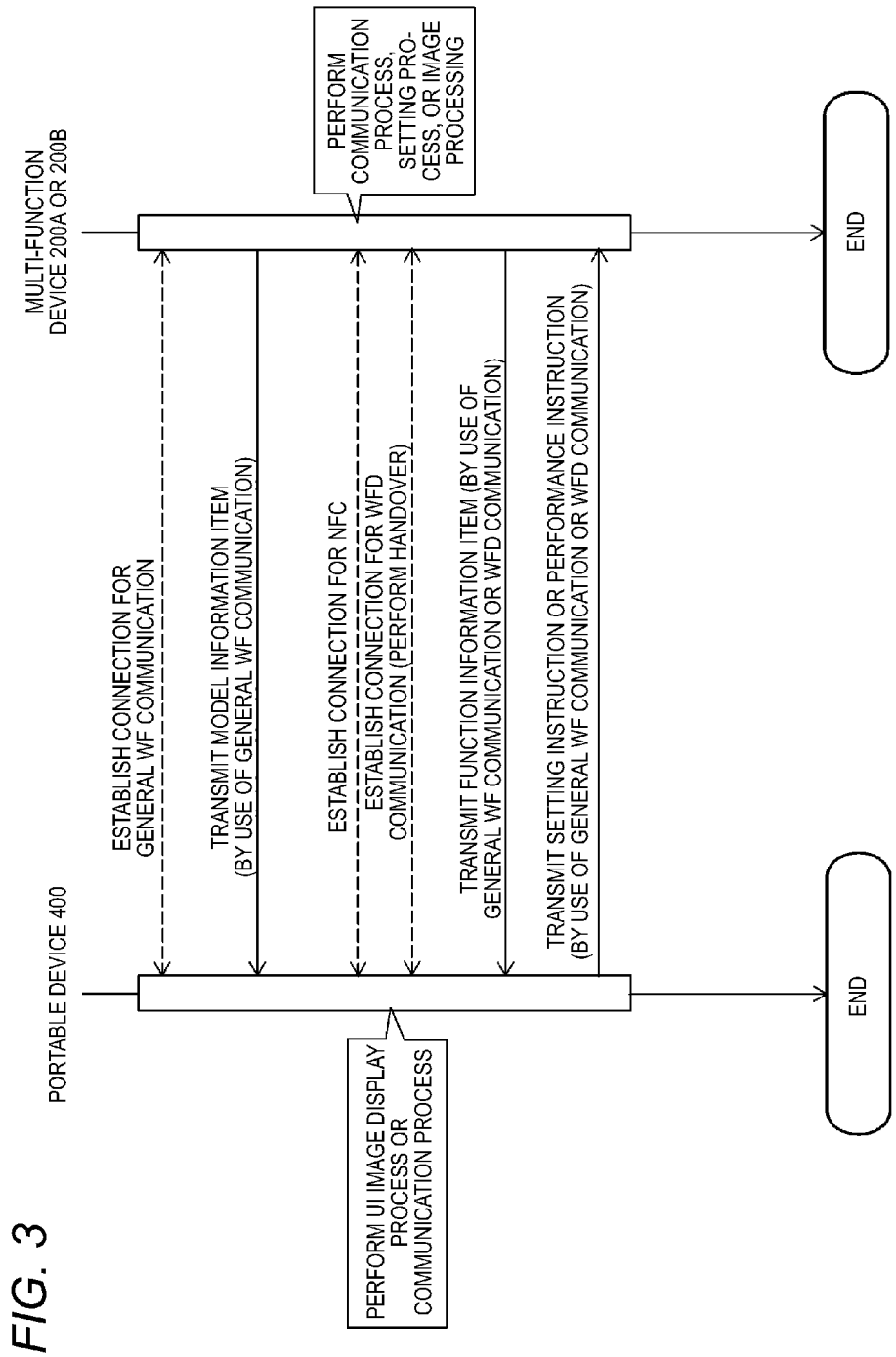
FIG. 3 is a sequence diagram illustrating the outline of an operation of the system of FIG. 1.

FIG. 3 is a sequence diagram illustrating the outline of an operation of the system of FIG. 1.

The operation of the system starts in a case where the user of the portable device 400 activates the device use program PG2 in the portable device 400. In a case where the user desires to use the image processing function of the multi-function device 200A or 200B, such as a case where the user desires to print image data stored in the portable device 400, the user activates the device use program PG2. It is assumed that at this time, the multi-function devices 200A and 200B have been powered up, the CPUs 210 of the multi-function devices 200A and 200B have executed the control programs 231, thereby capable of receiving setting instructions and performance instructions. Also, it is assumed that the multi-function devices 200A and 200B are being connected to the access point 50, and thus are participating in a wireless LAN established by the access point 50. An operation of the CPU 410 of the portable device 400 to be described below is an operation which is implemented by executing the device use program PG2.

If the device use program PG2 is activated, first, the CPU 410 of the portable device 400 establishes a connection with the access point 50, thereby participating in the wireless LAN established by the access point 50 (establishment of a connection for general WF communication). Specifically, the CPU 410 inquires of the access point 50 about information such as a service set identifier (SSID) or a basic service set identifier (BSSID) necessary to participate in the wireless LAN, and receives the corresponding information. The CPU 410 performs an association process or the like with respect to the access point 50 by use of the corresponding information, thereby establishing a connection with the access point 50.

Next, the CPU 410 of the portable device 400 performs a UI image display process of displaying a variety of UI images for receiving instructions of the user, on the display unit 480, and a communication process with the multi-function device 200A or 200B.

The CPU 210 of the multi-function device 200A or 200B performs the communication process with the portable device 400, a setting process based on a setting instruction from the portable device 400, and image processing based on a performance instruction from the portable device 400.

The communication process between the portable device 400 and the multi-function device 200A or 200B uses general WF communication, and includes a process of receiving a model information item.

Also, the communication process between the portable device 400 and either the multi-function device 200A or 200B includes a process of establishing a connection for NFC. The NFC IF 295 of the multi-function device 200A or 200B is emitting an electric wave for detecting a device (for example, the portable device 400) capable of performing NFC. For example, the user of the portable device 400 brings the portable device 400 close to the NFC IF 295 of the multi-function device 200A, such that the portable device 400 is positioned within a distance (for example, 5 cm) which the electric wave for detection can reach. Then, the NFC IF 490 of the portable device 400 receives the electric wave for detection from the NFC IF 295 of the multi-function device 200A, and transmits an electric wave as a response. As a result, between the portable device 400 and the multi-function device 200A, a connection for NFC is established.

Also, if a connection for NFC is established between the portable device 400 and either the multi-function device 200A or the multi-function device 200B, between the portable device 400 and either the multi-function device 200A or the multi-function device 200B, a process (also referred to as handover) of establishing a connection for WFD communication to substitute for the general WF communication is performed. For example, the established NFC is used to transmit setting information for WFD communication from the multi-function device 200A to the portable device 400. For example, the setting information for WFD communication is used for the portable device 400 and the multi-function device 200A to establish a connection for WFD communication in which the portable device 400 is a client device and the multi-function device 200A is a group owner device. A group owner device is a device which acts as an access point in WFD communication. Devices to perform WFD communication perform predetermined negotiation communication with one another, thereby determining which of a group owner device and a client device each device will operate as. The setting information for WFD communication includes security information such as an SSID, a BSSID, or a password. Whenever a connection for NFC is established between the portable device 400 and a specific device (for example, the multi-function device 200A or the multi-function device 200B), between the specific device and the portable device 400, a process of establishing a connection for WFD communication is performed; however, in a following description of the flow chart of FIG. 4, not every connection for WFD communication will not be described. If a connection for WFD communication is established, thereafter, even if the portable device 400 is brought away from the specific device, it is possible to keep one-to-one communication between the portable device 400 and the specific device. Also, since an amount of data capable of being transmitted and received by WFD communication for a unit time is larger than an amount of data capable of being transmitted and received by NFC for the unit time, for example, the portable device 400 is able to easily transmit a comparatively large amount of data, such as print data, to the specific device by use of WFD communication.

The communication process between the portable device 400 and either the multi-function device 200A or 200B includes a process of transmitting a function information item (FIG. 2A or 2B) from the multi-function device 200A or 200B to the portable device 400, and a process of transmitting instructions (a setting instruction and a performance instruction) relative to image processing, and image data to be used in the image processing, from the portable device 400 to the multi-function device 200A or 200B. In a case where a connection for WFD communication has been established, the communication process between them is performed by use of WFD communication; whereas in a case where a connection for WFD communication has not been established, the communication process between them is performed by use of general WF communication.

This operation of the system will be described with a focus on a UI image display process which is performed by the CPU 410 of the portable device 400.

Figure 4A:
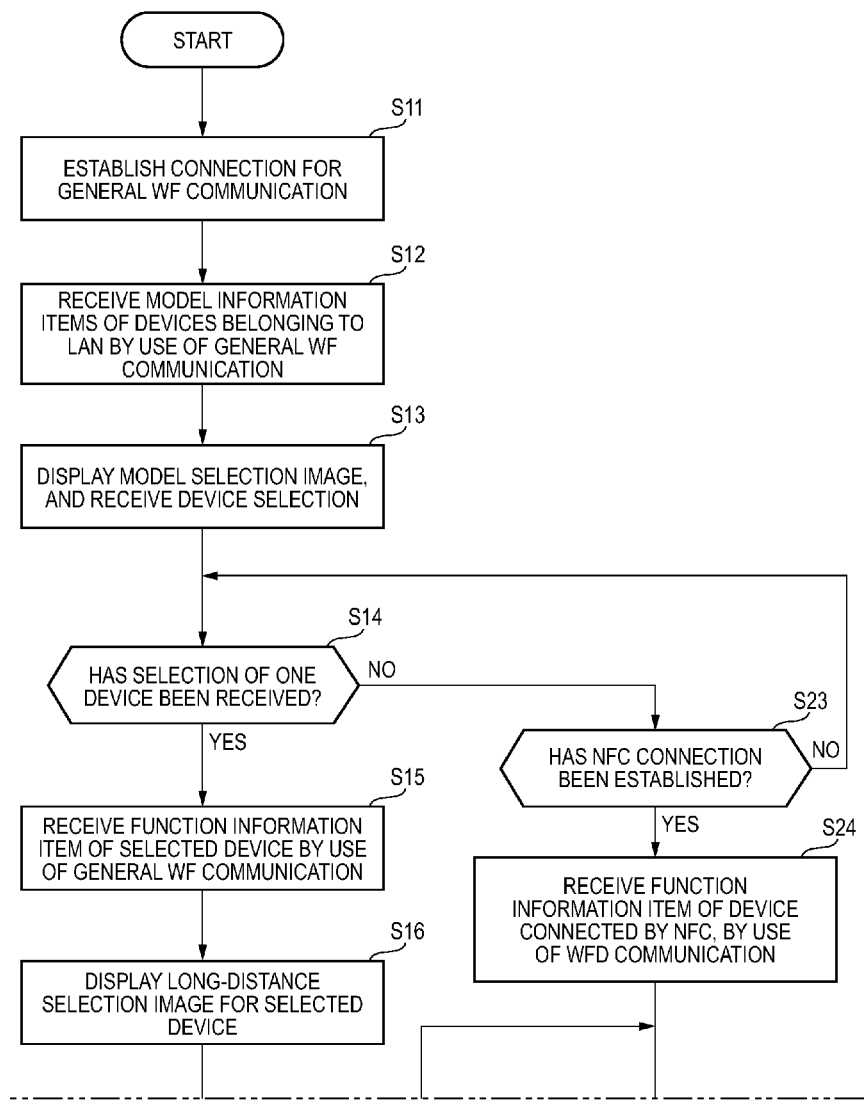
FIGS. 4A and 4B are flow charts of an UI image display process.
Figure 4B:
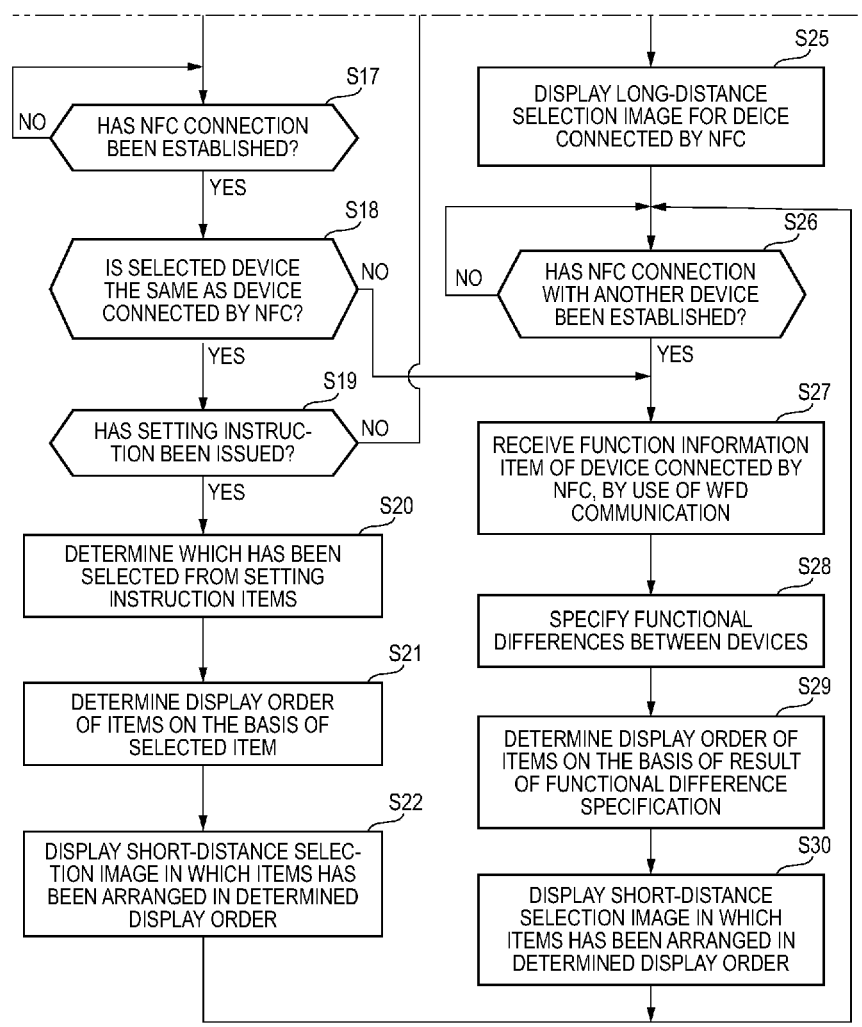

FIG. 4 is a flow chart illustrating a UI image display process. First, in STEP S11, the CPU 410 accesses the access point 50 and establishes a connection for general WF communication as described above. That is, the portable device 400 participates in the LAN to which the multi-function devices 200A and 200B belong.

In STEP S12, the CPU 410 of the portable device 400 receives the model information items of a plurality of devices connected through the wireless LAN. In the present illustrative embodiment, the CPU 410 receives the model information items of the multi-function devices 200A and 200B. Specifically, the CPU 410 broadcasts a command for inquiring about model information items, to the LAN. The command includes, for example, information capable of specifying the device use program PG2 stored in the portable device 400. In a case where each device, for example, the multi-function device 200A or 200B having received the command for inquiring can receive print instructions and setting instructions from the device use program PG2, that is, in a case where the corresponding device is usable by the device use program PG2, the corresponding device transmits its model information item as a response to the command. In the present illustrative embodiment, the portable device 400 receives model information items as responses to the command for inquiring, from the multi-function devices 200A and 200B. Each model information item includes an information item for specifying a device which is the transmission source, specifically, the model name of the multi-function device 200A or 200B, or the IP address of the multi-function device 200A or 200B.

In STEP S13, on the basis of the receiving model information items, the CPU 410 displays a model selection image OI1 on the display unit 480 of the portable device 400, and receives a device selection from the user. The model selection image OI1 is an image for allowing the user to select one device from the plurality of devices whose model information items have been received.

Figure 5:
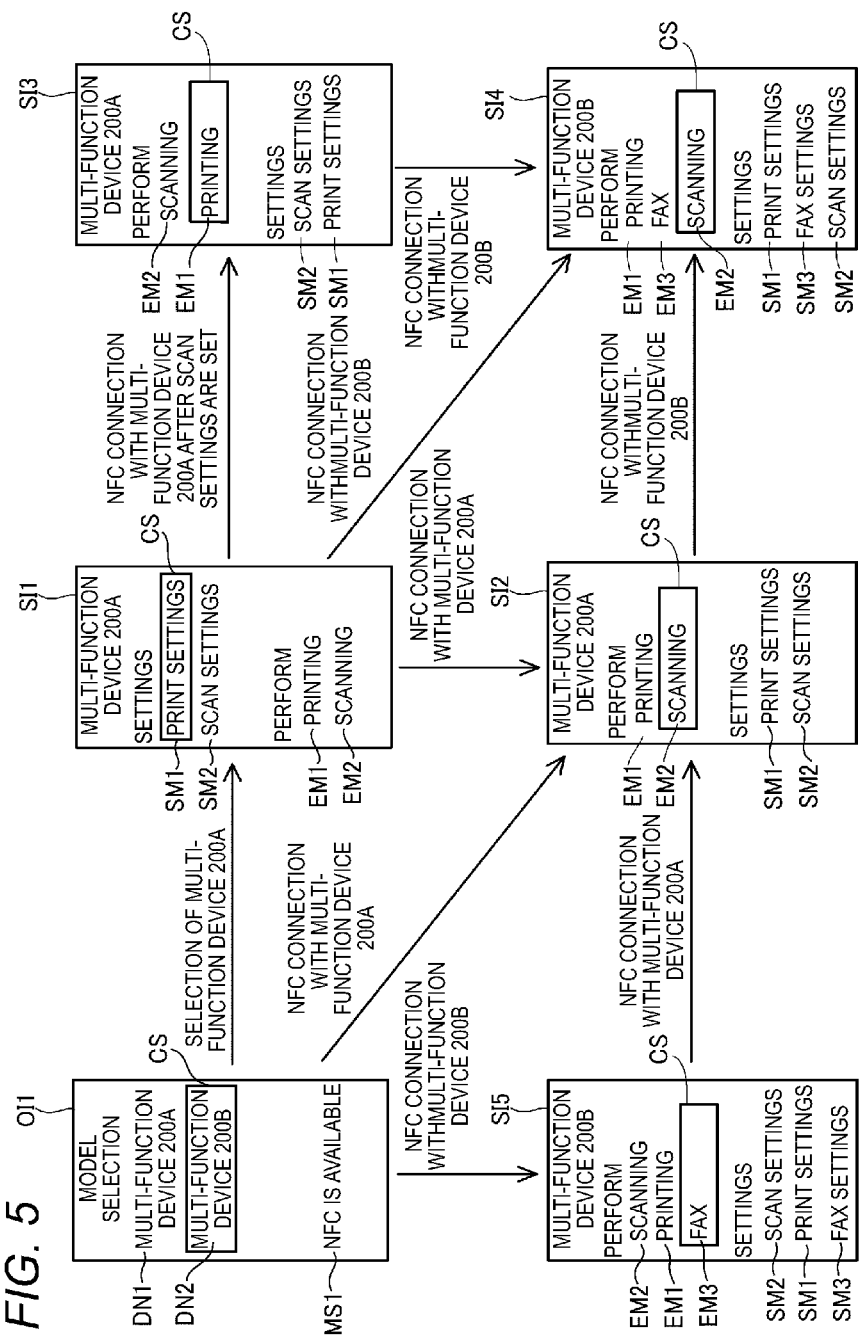
FIG. 5 is a state transition diagram illustrating transitions of UI images.

FIG. 5 is a state transition diagram illustrating transitions of UI images. In FIG. 5, the model selection image OI1 which is one of UI images is shown. The model selection image OI1 includes a plurality of items DN1 and DN2 representing the plurality of selectable devices, a cursor CS for selecting the item DN1 or DN2, and a message MS1 for the user. The items DN1 and DN2 include, for example, corresponding device names (in the present illustrative embodiment, the multi-function device 200A and the multi-function device 200B), respectively. The message MS1 includes a message which informs the user that NFC is available.

In STEP S14, the CPU 410 determines whether a selection of one device has been received through the model selection image OI1. In a case where a selection of one device has been received ("YES" in STEP S14), in STEP S15, the CPU 410 receives the function information item of the selected device, by use of general WF communication. For example, in a case where a selection of the multi-function device 200A has been received, the function information item FDa of FIG. 2A is received. Specifically, the CPU 410 transmits a command for requesting the function information item, to the selected multi-function device 200A. If receiving the corresponding command, the multi-function device 200A transmits the function information item FDa to the transmission source of the corresponding command. Therefore, the CPU 410 receives the function information item FDa as a response to the corresponding command.

If the function information item is received, in STEP S16, the CPU 410 displays a long-distance selection image for the selected device, on the display unit 480. For example, in a case where the multi-function device 200A has been selected, the CPU 410 displays a long-distance selection image SI1 (FIG. 5) for the multi-function device 200A, on the display unit 480.

The long-distance selection image SI1 includes a plurality of setting instruction items SM1 and SM2 for receiving setting instructions relative to the multi-function device 200A, and a plurality of performance instruction items EM1 and EM2 for receiving performance instructions relative to the multi-function device 200A. The first setting instruction item SM1 is a setting instruction item relative to a printing process which is image processing which can be performed by the multi-function device 200A. The second setting instruction item SM2 is a setting instruction item relative to a scanning process which is image processing which can be performed by the multi-function device 200A. The first performance instruction item EM1 is a performance instruction item for instructing the multi-function device 200A to perform a printing process. The second performance instruction item EM2 is a performance instruction item for instructing the multi-function device 200A to perform a scanning process. A setting instruction relative to a printing process can include, for example, settings relative to a paper size, a printing resolution, and a print color mode (a color mode or a monochrome mode). Also, settings relative to scanning can include settings relative to a read resolution, a file format for scanned data, and so on. The whole of the plurality of setting instruction items SM1 and SM2 is an example of a first item, and the whole of the plurality of performance instruction items EM1 and EM2 is an example of a second item. Further, each item, that is, each of the four items SM1, SM2, EM1, and EM2 is an example of a sub item.

It is assumed that the long-distance selection image SU is displayed in a case where the distance between the user and the multi-function device 200A is relatively long. In the long-distance selection image SI1, the setting instruction items SM1 and SM2 are displayed in preference to the performance instruction items EM1 and EM2. Specifically, the setting instruction items SM1 and SM2 are displayed in ranks higher than those of the performance instruction items EM1 and EM2 in the display order (on the upper side of FIG. 5).

Also, of the plurality of setting instruction items SM1 and SM2, the first setting instruction item SM1 relative to a printing process is displayed in a rank higher than that of the second setting instruction item SM2 relative to a scanning process in the display order. Also, of the plurality of performance instruction items EM1 and EM2, the first performance instruction item EM1 for instructing performance of a printing process is displayed in a rank higher than that of the second performance instruction item EM2 for instructing performance of a scanning process in the display order. Their display orders is a default display order, and is, for example, a display order according to the order in which they have been described in the function information item FDa (FIG. 2).

Also, if any one of the setting instruction items SM1 and SM2 and the performance instruction items EM1 and EM2 is selected in the long-distance selection image SI1, in response to this selection, a detail selection image or the like is displayed such that a setting instruction or a performance instruction of the user can be received. Specifically, in a case where the first setting instruction item SM1 is selected in the long-distance selection image SI1, a detail selection image including a plurality of options relative to printing, such as options for setting printing resolutions, and options for setting paper sizes, is displayed. Also, in a case where the first performance instruction item EM1 is selected in the long-distance selection image SI1, a detail selection image including two options for selecting whether or not to perform printing, specifically, an option for instructing start of printing, and an option for instructing stop of printing is displayed. Further, if a setting instruction or a performance information of the user is received through the long-distance selection image SI1 and a detail selection image, the setting instruction or the performance information which the user desires is transmitted to a corresponding device (for example, the multi-function device 200A) by use of general WF communication. Then, on the basis of the corresponding setting instruction or performance information, the corresponding device performs a setting process or image processing. These will not be described in detail. This is the same with respect to other selection images SI2 to SI5.

Also, in a case where it is determined in STEP S14 that a selection of the multi-function device 200B has been received, the CPU 410 receives the function information item FDb (FIG. 2B) of the multi-function device 200B, in STEP S15, and displays a long-distance selection image (not shown) for the multi-function device 200B, in STEP S16. Similarly in the long-distance selection image SU (FIG. 5) for the multi-function device 200A, in the long-distance selection image for the multi-function device 200B, setting instruction items are displayed in preference to performance instruction items.

In a case where it is determined in STEP S14 described above that a selection of one device has not been received through the model selection image OI1 (FIG. 5) ("NO" in STEP S14), in STEP S23, the CPU 410 determines whether any connection for NFC (also referred to simply as an NFC connection) has been established. In a case where any NFC connection has not been established ("NO" in STEP S23), the CPU 410 returns to STEP S14 while maintaining the display of the model selection image OI1. On the other hand, in a case where an NFC connection has been established ("YES" in STEP S23), the CPU 410 proceeds to STEP S24. That is, in a state where the model selection image OI1 is being displayed, before a selection of one device is received, if an NFC connection is established, the CPU 410 proceeds to STEP S24.

In STEP S24, the CPU 410 receives the function information item of a device with respect to which the connection for NFC has been established, by use of WFD communication. For example, in a case where the connection for NFC has been established between the multi-function device 200A and the portable device 400, the CPU 410 receives the function information item FDa of FIG. 2A. Specifically, similarly in STEP S15, the CPU 410 transmits a command for requesting the function information item, to the multi-function device 200A, thereby receiving the function information item FDa as a response to the corresponding command.

If the function information item is received, in STEP S25, the CPU 410 displays a short-distance selection image for the device with respect to which the connection for NFC has been established, on the display unit 480. For example, in the case where the connection for NFC has been established between the multi-function device 200A and the portable device 400, the CPU 410 displays a short-distance selection image SI2 (FIG. 5) for the multi-function device 200A, on the display unit 480. It is assumed that the short-distance selection image is displayed in a case where the distance between the user and the multi-function device 200A is relatively short.

Similarly to the above-described long-distance selection image SI1, the short-distance selection image SI2 includes a plurality of setting instruction items SM1 and SM2 and a plurality of performance instruction items EM1 and EM2 for the multi-function device 200A. However, unlike in the above-described long-distance selection image SI1, in the short-distance selection image SI2, the performance instruction items EM1 and EM2 are displayed in preference to the setting instruction items SM1 and SM2. Specifically, the performance instruction items EM1 and EM2 are displayed in ranks higher than those of the setting instruction items SM1 and SM2 in the display order (on the upper side of FIG. 5).

Also, similarly in the long-distance selection image SI1, of the plurality of setting instruction items SM1 and SM2, the first setting instruction item SM1 relative to a printing process is displayed in a rank higher than that of the second setting instruction item SM2 relative to a scanning process in the display order. Further, of the plurality of performance instruction items EM1 and EM2, the first performance instruction item EM1 for instructing performance of a printing process is displayed in a rank higher than that of the second performance instruction item EM2 for instructing performance of a scanning process in the display order.

Also, the plurality of items (that is, four items EM1, EM2, SM1, and SM2) which is displayed in the long-distance selection image SI1 is the same as the plurality of items which is displayed in the short-distance selection image SI2.

Also, in a case where it is determined in STEP S23 that a connection for NFC has been established between the multi-function device 200B and the portable device 400 ("YES" in STEP S23), the CPU 410 receives the function information item FDb of FIG. 2B, in STEP S24, and displays a short-distance selection image SI5 (FIG. 5) for the multi-function device 200B, in STEP S25. The short-distance selection image SI5 for the multi-function device 200B includes a third setting instruction item SM3 relative to a facsimileing process, in addition to setting instruction items SM1 and SM2, and includes a third performance instruction item EM3 for instructing performance of a facsimileing process, in addition to performance instruction items EM1 and EM2. Similarly in the short-distance selection image SI2 (FIG. 5) for the multi-function device 200A, in the short-distance selection image SI5 for the multi-function device 200B, the three performance instruction items EM1 to EM3 are displayed in preference to the three setting instruction items SM1 to SM3.

In a state where a short-distance selection image (for example, the short-distance selection image SI2 for the multi-function device 200A, or the short-distance selection image SI5 for the multi-function device 200B) is being displayed on the display unit 480, in STEP S26, the CPU 410 determines whether a connection for NFC with another device has been established. Another device is a device different from a device corresponding to the selection image being displayed at that moment on the display unit 480 (also referred to simply as a current device). The current device is, for example, the device with respect to which it has been determined in STEP S23 that a connection for NFC had been established. For example, in a case where it has been determined in STEP S23 that a connection for NFC with the multi-function device 200A has been established, whereby the short-distance selection image SI2 for the multi-function device 200A is being displayed in STEP S26, the multi-function device 200A is the current device. Therefore, in a case where the short-distance selection image SI2 for the multi-function device 200A is being displayed, if a connection for NFC has been established between the multi-function device 200B and the portable device 400, it is determined that a connection for NFC with another device has been established.

In a case where an NFC connection with another device has not been established ("NO" in STEP S26), while maintaining the display of the selection image (for example, the short-distance selection image SI2 or the long-distance selection image SI1) for the current device, the CPU 410 keeps monitoring on whether a NFC connection with another device has been established.

In a case where it is determined that an NFC connection with another device has been established ("YES" in STEP S26), in STEP S27, the CPU 410 receives the function information item of another device with respect to which a connection for NFC has been newly established, by use of WFD communication. For example, after it is determined in STEP S23 that a connection for NFC with the multi-function device 200A has been established (that is, while the short-distance selection image SI2 for the multi-function device 200A is being displayed on the display unit 480), if a connection for NFC is newly established between the multi-function device 200B and the portable device 400, the CPU 410 receives the function information item FDb of FIG. 2B. Specifically, the CPU 410 transmits a command for requesting the function information item, to the multi-function device 200B, thereby receiving the function information item FDb as a response to the corresponding command.

In STEP S28, the CPU 410 specifies the functional differences between the current device and another device with respect to which it has been determined in STEP S26 that a NFC connection had been established, by use of the function information items of both devices. The functional differences are functions which can be performed by another device, but cannot be performed by the current device. For example, in a case where the current device is the multi-function device 200A, and another device is the multi-function device 200B, the CPU 410 compares the function information item FDa of the multi-function device 200A and the function information item FDb of the multi-function device 200B, so as to extract the difference, thereby specifying the functional differences.

As shown in FIGS. 2A and 2B, the multi-function device 200A cannot perform a facsimileing process, but the multi-function device 200B can perform a facsimileing process. Also, in the printing process of the multi-function device 200A, it is impossible to perform printing onto A3 size paper; whereas in the multi-function device 200B, it is possible to perform printing onto A3 size paper. Between the scanning process of the multi-function device 200A and the scanning process of the multi-function device 200B, there is no functional difference. Therefore, in the case where the current device is the multi-function device 200A and another device is the multi-function device 200B, the facsimileing process and the printing process are image processing including functional differences, and the scanning process is image processing which does not include any functional difference.

On the other hand, in a case where it is determined in STEP S23 that a connection for the NFC with the multi-function device 200B (current device) has been established, and then it is determined in STEP S26 that a connection for NFC with the multi-function device 200A (another device) has been established, since all functions which can be performed by the multi-function device 200A can be performed by the multi-function device 200B, in STEP S28, the CPU 410 determines that there is no functional difference.

In STEP S29, on the basis of the result of the functional difference specification, the CPU 410 determines the priorities of a plurality of items required to be displayed in a short-distance selection image. In the present illustrative embodiment, the CPU 410 determines the display order of the plurality of items. Specifically, the CPU 410 determines the display order such that items relative to image processing including any functional difference are displayed in preference to items relative to image processing which does not include any functional difference. In a case where there is no functional difference, the CPU 410 determines the display order according to the default display order, that is, the sorting order of the function information item (FIG. 2A or 2B).

In STEP S30, the CPU 410 changes the selection image being displayed on the display unit 480, to a short-distance selection image in which items has been arranged in the determined display order. In FIG. 5, as an example of the short-distance selection image which is displayed in STEP S30, a short-distance selection image SI4 for the multi-function device 200B is shown. This example corresponds to a case where the current device is the multi-function device 200A, and another device is the multi-function device 200B, and in STEP S30, the CPU 410 changes the selection image being displayed on the display unit 480 from the short-distance selection image SI2 for the multi-function device 200A to the short-distance selection image SI4 for the multi-function device 200B. It can be understood that the short-distance selection image SI4 is different from the default short-distance selection image SI5 in the item display order. Specifically, in the short-distance selection image SI4, of the three performance instruction items EM1 to EM3, two performance instruction items EM1 and EM3 for instructing performance of image processing (specifically, the printing process and the facsimileing process) including the functional differences are displayed in ranks higher than that of the second performance instruction item EM2 for instructing performance of the scanning process which does not include any functional difference, in the display order. Further, in the short-distance selection image SI4, of the three setting instruction items SM1 to SM3, two setting instruction items SM1 and SM3 relative to image processing (specifically, the printing process and the facsimileing process) including the functional differences are displayed in ranks higher than that of the second setting instruction item SM2 relative to the scanning process which does not include any functional difference, in the display order.

Also, similarly in the default short-distance selection image SI5, in the short-distance selection image SI4, the three performance instruction items EM1 to EM3 are displayed in ranks higher than those of the three setting instruction items SM1 to SM3 in the display order.

On the other hand, in the case where it is determined in STEP S23 that a connection for the NFC with the multi-function device 200B (current device) has been established, and then it is determined in STEP S26 that a connection for NFC with the multi-function device 200A (another device) has been established, there is no functional difference (that is, all of the image processing functions which can be performed by the multi-function device 200A can be performed by the multi-function device 200B). Therefore, in STEP S30, the CPU 410 changes the selection image being displayed on the display unit 480 from the short-distance selection image SI5 for the multi-function device 200B to the default short-distance selection image SI2 for the multi-function device 200A (FIG. 5), for example.

After the long-distance selection image for the selected device (the long-distance selection image SI1 (FIG. 5) for the multi-function device 200A) is displayed in STEP S16, in STEP S17, similarly in STEP S23 described above, the CPU 410 determines whether any connection for NFC has been established.

In a case where any NFC connection has not been established ("NO" in STEP S17), while maintaining the display of the long-distance selection image, the CPU 410 keeps monitoring on whether any NFC connection has been established.

In a case where an NFC connection has been established ("YES" in STEP S17), in STEP S18, the CPU 410 determines whether the device selected in STEP S14, that is, the device corresponding to the long-distance selection image being displayed at that moment is the same as the device with respect to which the NFC connection has been established. For example, in a case where an NFC connection between the multi-function device 200A and the portable device 400 was established when the long-distance selection image SI1 (FIG. 5) for the multi-function device 200A was being displayed, the CPU 410 determines that the device selected in STEP S14 is the same as the device with respect to which the NFC connection has been established. Also, in a case where an NFC connection between the multi-function device 200B and the portable device 400 was established when the long-distance selection image SU (FIG. 5) for the multi-function device 200A was being displayed, the CPU 410 determines that the device selected in STEP S14 is different from the device with respect to which the NFC connection has been established.

In a case where the device selected in STEP S14 is different from the device with respect to which the NFC connection has been established ("NO" in STEP S18), the CPU 410 proceeds to the process of STEP S27. As a result, the CPU 410 performs the processes of STEPS S27 to S30 described above, thereby displaying a short-distance selection image in which items has been arranged in the determined display order, on the display unit 480. For example, the CPU 410 changes the selection image being displayed on the display unit 480 from the long-distance selection image SI1 for the multi-function device 200A to the short-distance selection image SI4 for the multi-function device 200B.

In a case where it is determined in STEP S14 that the selected device is the same as the device with respect to which the NFC connection has been established ("YES" in STEP S18), in STEP S19, the CPU 410 determines whether the user has selected a setting instruction item included in the long-distance selection image displayed at that moment, thereby issuing a setting instruction.

In a case where any setting instruction has not been issued ("NO" in STEP S19), the CPU 410 proceeds to STEP S25. As a result, a short-distance selection image for the device with respect to which the connection for NFC connection has been established is displayed on the display unit 480. For example, in a case where a connection for NFC between the multi-function device 200A and the portable device 400 has been established, the CPU 410 changes the selection image being displayed on the display unit 480 from the long-distance selection image SI1 for the multi-function device 200A to the short-distance selection image SI2 (FIG. 2) for the multi-function device 200A.

In a case where a setting instruction has been issued ("YES" in STEP S19), in STEP S20, the CPU 410 determines which item has been selected from the plurality of setting instruction items included in the long-distance selection image displayed at that moment. For example, in a case where the long-distance selection image SI1 for the multi-function device 200A is being displayed, the CPU 410 determines which item the user has selected from the plurality of setting instruction items SM1 and SM2 of the long-distance selection image SI1.

In STEP S21, on the basis of the selected setting instruction item, the CPU 410 determines the priorities of a plurality of items required to be displayed in a short-distance selection image. In the present illustrative embodiment, the CPU 410 determines the display order of the plurality of items. Specifically, the CPU 410 determines the display order such that items relative to image processing corresponding to the selected setting instruction item are displayed in preference to the other items relative to image processing corresponding to the other unselected setting instruction items.

In STEP S22, the CPU 410 changes the selection image being displayed on the display unit 480 to a short-distance selection image in which items has been arranged in the determined display order. In FIG. 5, as an example of the short-distance selection image which is displayed in STEP S22, a short-distance selection image SI3 for the multi-function device 200A is shown. Here, an example in which the user has selected the second setting instruction item SM2 relative to the scanning process, in the long-distance selection image SI1 for the multi-function device 200A, whereby a setting instruction relative to the scanning process has been issued is shown. It can be understood that the short-distance selection image SI3 is different from the default short-distance selection image SI2 in the item display order. Specifically, in the short-distance selection image SI3, of the two performance instruction items EM1 and EM2, the second performance instruction item EM2 for instructing performance of the scanning process is displayed in a rank higher than that of the first performance instruction item EM1 for instructing performance of the printing process, in the display order. Further, in the short-distance selection image SI3, of the two setting instruction items SM1 and SM2, the second setting instruction item SM2 relative to the scanning process is displayed in a rank higher than that of the first setting instruction item SM1 relative to the printing process, in the display order.

After STEP S22 or STEP S30, the CPU 410 proceeds to STEP S26, in which the CPU 410 determines whether a connection for NFC with another device has been established.

Also, if the user selects any one of the performance instruction items EM1 to EM3 in any one image of the selection images SI1 to SI5, as described above, in response to the selection, a detail selection image or the like is displayed so as to be able to receive a performance instruction of the user. Specifically, in a case where the first performance instruction item EM1 is selected, a detail selection image including two items for selecting whether or not to perform printing, specifically, an item for instructing start of printing, and an item for instructing stop of printing is displayed. Thereafter, if a performance instruction of the user is received through the selected image SI1 and the detail selection image, the CPU 410 transmits the performance instruction which the user desires, to a corresponding device (for example, the multi-function device 200A) by use of general WF communication or WFD communication. That is, on the basis of the received user's performance instruction, the CPU 410 instructs the corresponding device (for example, the multi-function device 200A) to perform image processing (for example, the printing process or the scanning process).

According to the present illustrative embodiment described above, before the CPU 410 controls the display unit 480 to display the long-distance selection image SI1 for the multi-function device 200A in STEP S16, in a case where the portable device 400 and the multi-function device 200A are connected by NFC ("YES" in STEP S23), in STEP S25, the CPU 410 controls the display unit 480 to display the short-distance selection image SI2. In the long-distance selection image SI1, as described above, the two setting instruction items SM1 and SM2 are displayed in preference to the two performance instruction items EM1 and EM2. Also, in the short-distance selection image SI2, the two performance instruction items EM1 and EM2 are displayed in preference to the two setting instruction items SM1 and SM2. Therefore, according to whether the portable device 400 and the multi-function device 200A have been connected by use of NFC, selection images different from each other in items required to be preferentially displayed are displayed on the display unit 480 of the portable device 400, respectively. Therefore, it is possible to appropriately display a plurality of items on the display unit 480 of the portable device 400.

More specifically, NFC is a system whose communication range is shorter than that of general WF communication or WFD communication. Therefore, according to whether a connection for NFC having relatively short communication range has been established, selection images different from each other in items to be preferentially displayed are displayed on the display unit of the terminal device, respectively. As a result, according to whether the distance between the terminal device and a first image processing device is relatively short, selection images different from each other in items required to be preferentially displayed are displayed on the display unit 480 of the portable device 400, respectively.

In a case of instructing the multi-function device 200A to perform image processing, the user often needs to perform preparing for performing the image processing, confirming of the result of performance of the image processing, and so on. Preparing for performing the image processing includes, for example, setting of a document on the scanner unit 250, and setting of print sheets in the printer unit 240, for the scanning process or the facsimileing process. Confirming of the result of performance of the image processing includes, for example, confirming the print result of the printing process. Also, in case of the printing process, the user also needs to recover a printed document. For this reason, it can be considered that in a case where the user (the portable device 400) is relatively close to a device to which a performance instruction can be issued, a possibility that a performance instruction for image processing will be issued is relatively high; whereas in a case where the user is relatively far from a device to which a performance instruction can be issued, a possibility that a performance instruction for image processing will be issued is relatively low. Therefore, according to the present illustrative embodiment, in a case where a possibility that a performance instruction for image processing will be issued is relatively high, items for receiving performance instructions are preferentially displayed on the display unit 480 of the portable device 400; whereas in a case where a possibility that a performance instruction for image processing will be issued is relatively low, items for receiving setting instructions are preferentially displayed on the display unit 480 of the portable device 400. As a result, items which are more likely to be selected by the user are preferentially displayed. Therefore, it is possible to improve the convenience of the selection images.

Also, the plurality of items (that is, four items EM1, EM2, SM1, and SM2) which is displayed in the long-distance selection image SI1 is the same as the plurality of items which is displayed in the short-distance selection image SI2. Therefore, selection images which are the same as each other in a plurality of items required to be displayed and are different from each other in items to be preferentially displayed can be displayed on the display unit 480 of the portable device 400. As a result, it is possible to display a more convenient selection image on the display unit.

Also, after a specific operation is received from the user through the long-distance selection image SI1 for the multi-function device 200A, if the portable device 400 and the multi-function device 200A are connected by use of NFC, the CPU 410 controls the display unit 480 to display the short-distance selection image SI3 different from the short-distance selection image SI2. As a result, according to whether the specific operation has been received from the user through the long-distance selection image SI1, selection images different from each other are displayed on the display unit 480 of the terminal device. Therefore, it is possible to display a more appropriate selection image on the display unit 480 of the portable device 400. The specific operation includes, for example, a user's selection of at least one from the plurality of items included in the long-distance selection image SI1 and selectable by the user.

More specifically, after the long-distance selection image SI1 for the multi-function device 200A is displayed on the display unit 480 in STEP S16, if the multi-function device 200A and the portable device 400 are connected by use of NFC ("YES" in STEP S17), and a setting instruction is issued through the long-distance selection image SI1 ("YES" in STEP S19), in STEP S20, the CPU 410 determines which setting instruction item has been selected. Thereafter, in STEP S22, the CPU 410 displays the short-distance selection image SI3 on the display unit 480 such that items relative to image processing corresponding to the selected item are displayed in preference to items relative to image processing corresponding to the unselected item.

In a case where an item relative to image processing (for example, the setting instruction item relative to the scanning process) is selected in the long-distance selection image SI1, it can be considered that a possibility that the user will use an image processing function (for example, the scanning process) corresponding to the selected item is high. According to the present illustrative embodiment, it is possible to preferentially display an item (for example, the setting instruction item relative to the scanning process) relative to an image processing function more likely to be used. Therefore, it is possible to more appropriately display the plurality of items on the display unit 480 of the portable device 400.

Further, in the present illustrative embodiment, after a selection image for the multi-function device 200A is displayed in STEP S25 or S22, if the portable device 400 and the multi-function device 200B are connected by use of NFC ("YES" in STEP S26), in STEP S30, the CPU 410 controls the display unit 480 to display the short-distance selection image SI4 for the multi-function device 200B. In a case where the portable device 400 and the multi-function device 200B are connected ("YES" in STEP S23) in a state where a selection image for the multi-function device 200A is not being displayed, the short-distance selection image SI4 is different from the short-distance selection image SI5 for the multi-function device 200B which is displayed on the display unit 480 in STEP S25. As a result, it is possible to display a more appropriate image as a selection image for the multi-function device 200B on the display unit 480 of the portable device 400.

Specifically, in the short-distance selection image SI4, items relative to image processing (for example, the printing process) including a function (for example, printing onto A4 size paper) which can be performed by the multi-function device 200B but cannot be performed by the multi-function device 200A are displayed in preference to items relative to the other image processing (for example, the scanning process).

After a selection image (for example, the long-distance selection image SI1 or the short-distance selection image SI2) for a specific device (for example, the multi-function device 200A) is displayed, if a connection for NFC with another device (for example, the multi-function device 200B) is established, it can be considered that the user has changed a device to be used, from the specific device to another device. In this case, it can be considered that a possibility that the user will use a function which cannot be performed by the specific device but can be performed by another device is relatively high. For this reason, according to the present illustrative embodiment, it is possible to more appropriately display a plurality of items on the display unit 480 of the portable device 400.

Also, according to the present illustrative embodiment, in a case where the CPU 410 controls the display unit 480 in STEP S13 to display the model selection image OI1 for allowing the user to select one device from the plurality of devices (for example, the multi-function device 200A and the multi-function device 200B) connected to the wireless LAN, and the user selects the multi-function device 200A through the model selection image OI1 ("YES" in STEP S14), in STEP S16, the CPU 410 controls the display unit 480 to display the long-distance selection image SI1. Thereafter, in a case where the portable device 400 and the multi-function device 200A are connected by use of NFC, in other words, in a case where the user brings the portable device 400 close to the NFC IF 295 of the multi-function device 200A, whereby the multi-function device 200A is selected, the CPU 410 controls the display unit 480 to display the short-distance selection image SI2. Therefore, according to manners in which the multi-function device 200A is selected, selection images different from each other in items required to be preferentially displayed are displayed on the display unit of the terminal device, respectively. Therefore, it is possible to more appropriately display a plurality of items on the display unit 480 of the portable device 400.

As described above, according to the present illustrative embodiment, it is possible to more appropriately display a plurality of items included in a selection image. As a result, it is possible to improve the convenience of the portable device 400 capable of performing wireless communication with a device such as the multi-function device 200A or the multi-function device 200B, thereby issuing an instruction to the multi-function device 200A or the multi-function device 200B.

Modifications to Illustrative Embodiments (1) When a specific item is referred to as being displayed in preference to the other items, it is displayed such that the user is able to select the specific item easily. In the above-described illustrative embodiment, the CPU 410 displays items required to be preferentially displayed such that the corresponding items are in ranks higher than those of the other items in the display order. Alternatively, the CPU 410 may display items required to be preferentially displayed, more largely than the other items, or more thickly than the other items. Also, the CPU 410 may display only items required to be preferentially displayed, without displaying the other items.

(2) Alternative to NFC of the above-described illustrative embodiment, any other communication system whose communication range is relatively short may be used. For example, Bluetooth (registered as a trade mark), infrared communication, TransferJet (registered as a trade mark), or the like may be used. Also, alternative to general WF communication or WFD communication of the above-described illustrative embodiment, any other communication system whose communication range is relatively long may be used. For example, wireless communication (for example, W-CDMA) based on the mobile phone communication system which is performed between a base station and the portable device 400 may be used. In this case, for example, the multi-function device 200A and the multi-function device 200B are connected to the Internet through a wired or wireless LAN. Further, the portable device 400 is connected to the multi-function device 200A and the multi-function device 200B through the mobile phone communication system and the Internet.

(3) In the above-described illustrative embodiment, in the case where a connection for NFC is established between the portable device 400 and either the multi-function device 200A or 200B, handover to WFD communication is performed, and communication relative to function information items and instructions is performed by WFD communication. Alternatively, communication relative to function information items and instructions may be performed by general WF communication or by NFC.

(4) In the above-described illustrative embodiment, as examples of the image processing devices, the multi-function devices 200A and 200B have been exemplified. However, as the image processing devices, various other devices such as a single printer or scanner, or a digital camera may be used. The detailed contents of the items which are included in the selection images SI1 to SI5 can be appropriately changed according to the contents of the image processing functions which the image processing devices to be used can perform.

(5) The portable device 400 does not need to be able to display all of the five selection images SI1 to SI5 shown in FIG. 5, and may be able to only some of the five selection images SI1 to SI5. Specifically, functions of displaying the short-distance selection image SI3 and the short-distance selection image SI4 may be omitted. In this case, the process shown in FIG. 4 is appropriately simplified due to the omitted display functions.

(6) In the above-described illustrative embodiment, in the selection images SI1 to SI5, the setting instruction items and the performance information items are displayed. However, any other items may be added. For example, status acquisition items for receiving the device statuses of the multi-function devices 200A and 200B from the multi-function devices 200A and 200B may be added. Similarly to the setting instruction items, it can be considered that in a case where the distance between the portable device 400 and either the multi-function device 200A or 200B is relatively long, a corresponding status acquisition item is more likely to be selected than the performance information items; whereas in a case where the distance between the portable device 400 and either the multi-function device 200A or 200B is relatively short, a corresponding status acquisition item is more unlikely to be selected than the performance information items. For this reason, in short-distance selection images, it is preferable that the performance information items should be displayed in preference to the status acquisition items, and in long-distance selection images, it is preferable that the status acquisition items should be displayed in preference to the performance information items.

(7) In the above-described illustrative embodiment, some of components implemented by hardware may be replaced with software, and conversely, some of components implemented by software may be replaced with hardware.

(8) In a case where some or all of the functions of the present invention are implemented by software, the software (computer program) can be stored on a computer-readable recording media to be provided. The computer-readable recording media are not limited to portable recording media such as memory cards and CD-ROMs, but include various internal storage devices such as RAMs and ROMs built in computers, and external storage devices such as hard disk drives connected to computers.

Although the example and modifications of the invention are described above, the above embodiment is provided for the purpose of helping better understanding of the invention but does not limit the scope of the invention. The invention can be changed or modified without departing from the gist of the invention and the scope of claims, and includes equivalents thereof.

What is claimed is:

1. A non-transitory computer-readable medium having a computer program stored thereon and readable by a computer of a terminal device, the computer program, when executed by the computer, causes the computer to perform operations comprising:

connecting the terminal device and a first image processing device by use of a first wireless communication system, the first wireless communication system using a network in which three or more devices are able to participate;

controlling a display unit of the terminal device to display a first selection image including a first item and a second item for receiving user's instructions relative to image processing;

connecting the terminal device to the first image processing device by use of a second wireless communication system, the second wireless communication system having a short communication range and performing one-to-one communication between devices;

connecting the terminal device and the first image processing device by use of the first wireless communication system, after connecting by use of the second wireless communication system in response to the terminal device being brought close to the first image processing device;

controlling the display unit to display a second selection image in response to the terminal device and the first image processing device being connected by use of the first communication system after connecting by use of the second wireless communication system before the display unit is controlled to display the first selection image, the second selection image being different from the first selection image, and the second selection image including the first item and the second item; and instructing the first image processing device to perform the image processing in response to receiving an instruction for performing the image processing through one of the first and second selection images, wherein in the first selection image, the first item is displayed in preference to the second item, wherein in the second selection image, the second item is displayed in preference to the first item and wherein the first selection image, which is displayed on the display unit after connecting the terminal device to the first image processing device by use of the first communication system, changes to the second selection image in response to previously connecting by use of the second wireless communication system.

2. The non-transitory computer-readable medium according to claim 1, wherein the second wireless communication system has a communication range that is shorter than a communication range of the first wireless communication system.

3. The non-transitory computer-readable medium according to claim 1,
wherein the first item is an item for receiving a setting instruction relative to the first image processing device, and
wherein the second item is an item for receiving a performance instruction for the first image processing device to perform image processing.

4. The non-transitory computer-readable medium according to claim 1, wherein the operation of controlling the display unit further comprises, controlling the display unit to display a third selection image that is different from the second selection image in response to the terminal device and the first image processing device being connected by use of the second wireless communication system after a specific operation has been received from the user through the first selection image.

5. The non-transitory computer-readable medium according to claim 4,
wherein the first item includes a first sub item relative to first image processing and a second sub item relative to second image processing,
wherein the operations further comprise determining which sub item of the first sub item and the second sub item has been selected through the first selection image, and
wherein in the third selection image, an item relative to image processing corresponding to the selected sub item is displayed in preference to an item relative to image processing corresponding to the unselected sub item.

6. The non-transitory computer-readable medium according to claim 1,
wherein the operation of connecting is able to connect the terminal device and a second image processing device by use of the second wireless communication system,
wherein the operation of controlling the display unit further comprises:
controlling the display unit to display a fourth selection image for the second image processing device in response to the terminal device and the second image processing device being connected by use of the second wireless communication system after the first selection image for the first image processing device has displayed; and
controlling the display unit to display a fifth selection image that is different from the fourth selection image for the second image processing device in response to the terminal device and the second image processing device being connected in a state where the first selection image for the first image processing device has not been displayed.

7. The non-transitory computer-readable medium according to claim 6,
wherein the first item included in the fourth selection image for the second image processing device includes a third sub item relative to third image processing, and a fourth sub item relative to fourth image processing,
wherein the third image processing includes a function which is able to be performed by the second image processing device but is unable to be performed by the first image processing device, and
wherein in the fourth selection image, the third sub item is displayed in preference to the fourth sub item.

8. The non-transitory computer-readable medium according to claim 1,
wherein the first wireless communication system uses a network in which three or more devices are able to participate,
wherein the second wireless communication system is configured to perform one-to-one communication between devices, and
wherein the operation of controlling the display unit further comprises:
controlling the display unit to display a designation image for allowing designation of one image processing device from a plurality of image processing devices connected to the network of the first wireless communication system;
controlling the display unit to display the first selection image in response to the first image processing device being selected through the designation image; and
controlling the display unit to display the second selection image in response to the first image processing device being designated by connecting the terminal device and the first image processing device on a one-to-one basis by use of the second wireless communication system.

9. The non-transitory computer-readable medium according to claim 1,
wherein the first wireless communication system includes a communication system based on a Wi-Fi standard, and
wherein the second wireless communication system includes a communication system based on an NFC standard.

10. A terminal device comprising:
a first connecting unit configured to perform a wireless communication according to a first wireless communication system, the first wireless communication system using a network in which three or more devices are able to participate;
a second connecting unit configured to perform a wireless communication according to a second wireless communication system, the second wireless communication system having a short communication range and performing one-to-one communication between devices;
a display unit;
a processor; and
a memory storing instructions, the instructions, when executed by the processor, causing the terminal device to perform:
connecting to a first image processing device by use of the first wireless communication system;
controlling the display unit to display a first selection image including a first item and a second item for receiving user's instructions relative to image processing;
connecting to the first image processing device by use of the first wireless communication system after connecting by use of the second wireless communication system in response to the terminal device being brought close to the to the first image processing device;
controlling the display unit to display a second selection image in response to the terminal device and the first image processing device being connected by use of the first communication system after connecting by use of the second wireless communication system before the display unit is controlled to display the first selection image, the second selection image being different from the first selection image, and the second selection image including the first item and the second item; and instructing the first image processing device to perform the image processing in response to receiving an instruction for performing the image processing through one of the first and second selection images, wherein in the first selection image, the first item is displayed in preference to the second item, wherein in the second selection image, the second item is displayed in preference to the first item and wherein the first selection image, which is displayed on the display unit after connecting to the first image processing device by use of the first communication system, changes to the second selection image in response to previously connecting by use of the second wireless communication system.

* * * * *